US009866156B2

(12) United States Patent
Nishiyama

(10) Patent No.: US 9,866,156 B2
(45) Date of Patent: Jan. 9, 2018

(54) MOTOR CONTROL DEVICE AND MOTOR CONTROL METHOD

(71) Applicant: DENSO CORPORATION, Kariya, Aichi-pref. (JP)

(72) Inventor: Yasuharu Nishiyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 86 days.

(21) Appl. No.: 14/916,383

(22) PCT Filed: Nov. 26, 2014

(86) PCT No.: PCT/JP2014/005902
§ 371 (c)(1),
(2) Date: Mar. 3, 2016

(87) PCT Pub. No.: WO2015/087503
PCT Pub. Date: Jun. 18, 2015

(65) Prior Publication Data
US 2016/0197567 A1 Jul. 7, 2016

(30) Foreign Application Priority Data

Dec. 10, 2013 (JP) .................................. 2013-254968

(51) Int. Cl.
*H02P 6/10* (2006.01)
*H02P 29/68* (2016.01)
(Continued)

(52) U.S. Cl.
CPC .................. *H02P 6/10* (2013.01); *H02P 6/18* (2013.01); *H02P 6/182* (2013.01); *H02P 27/08* (2013.01); *H02P 29/68* (2016.02)

(58) Field of Classification Search
CPC .................................... H02P 6/10; H02P 29/68
(Continued)

(56) References Cited

U.S. PATENT DOCUMENTS 6,115,270 A * 9/2000 Yamane .................. H02M 1/14
363/141
2008/0084716 A1* 4/2008 Ganev ..................... H02M 1/14
363/39
(Continued)

FOREIGN PATENT DOCUMENTS

JP     H03-203521 A     9/1991
JP     H10-285989 A    10/1998
(Continued)

OTHER PUBLICATIONS

International Search Report and Written Opinion of the International Searching Authority dated Feb. 17, 2015 issued in the corresponding International application No. PCT/JP2014/005902 (and English translation).

*Primary Examiner* — Eduardo Colon Santana
*Assistant Examiner* — Devon Joseph
(74) *Attorney, Agent, or Firm* — Posz Law Group, PLC

(57) ABSTRACT

A motor control device for controlling a brushless DC motor in a PWM control manner using an inverter circuit according to a position-sensorless method includes: a ripple current estimating device; and a control device. When the magnitude of the ripple current is less than or equal to a threshold value, the control device performs balanced-drive switching that a first output terminal of the inverter circuit is repeatedly and alternately connected to high and low voltage sides of a drive power supply, and the second output terminal of the inverter circuit is repeatedly and alternately connected to the low and high voltage sides. When the magnitude of the ripple current exceeds the threshold value, the control device performs unbalanced-drive switching that the first output terminal is repeatedly and alternately connected to the high and low voltage sides, and the second output terminal is connected only to the low voltage side.

16 Claims, 12 Drawing Sheets

(51) Int. Cl.
*H02P 6/18* (2016.01)
*H02P 6/182* (2016.01)
*H02P 27/08* (2006.01)

(58) Field of Classification Search
USPC .................................................. 318/400.17
See application file for complete search history.

(56) References Cited

U.S. PATENT DOCUMENTS

| | | | |
|---|---|---|---|
| 2009/0174350 A1 | 7/2009 | Kuroda et al. | |
| 2009/0261775 A1 | 10/2009 | Son et al. | |
| 2010/0164416 A1* | 7/2010 | Yamada | H02M 1/12 |
| | | | 318/400.13 |
| 2011/0168697 A1 | 7/2011 | Kazama et al. | |
| 2013/0147406 A1* | 6/2013 | Kuroda | H02M 7/53875 |
| | | | 318/400.13 |

FOREIGN PATENT DOCUMENTS

| | | |
|---|---|---|
| JP | 2007-174745 A | 7/2007 |
| JP | 2010-017044 A | 1/2010 |
| JP | 2011-217504 A | 10/2011 |
| JP | 2012-151967 A | 8/2012 |
| JP | 2013-198299 A | 9/2013 |
| WO | 2011/024339 A1 | 3/2011 |

* cited by examiner

FIG. 5A

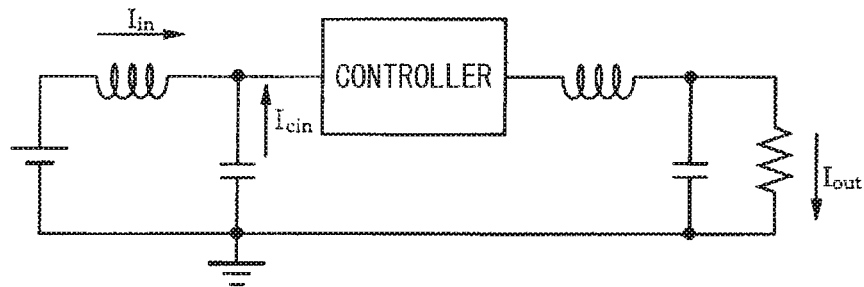

FIG. 5B

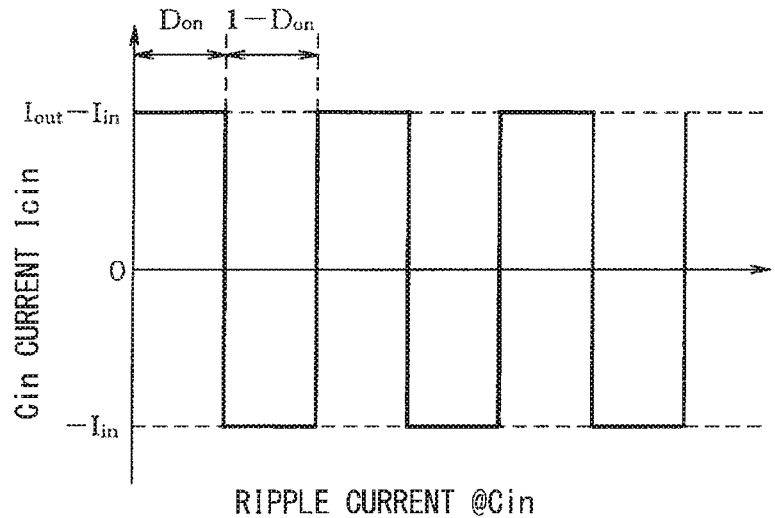

RIPPLE CURRENT @Cin

FIG. 5C $$I_{cin\_rms} = \sqrt{(I_{out}-I_{in})^2 \times D_{on} + I_{in}^2 \times (1-D_{on})}$$

$$= \sqrt{(I_{out}-I_{out} \times D_{on})^2 \times D_{on} + I_{out}^2 \times D_{on}^2 \times (1-D_{on})}$$

$$= \sqrt{I_{out}^2 \times (1-D_{on})^2 \times D_{on} + I_{out}^2 \times D_{on}^2 \times (1-D_{on})}$$

$$= I_{out} \times \sqrt{(1-D_{on}) \times D_{on} \times (1-D_{on}+D_{on})}$$

$$= I_{out} \times \sqrt{(1-D_{on}) \times D_{on}}$$

(*) RIPPLE CURRENT CONTAINED IN COIL CURRENT IS NEGLIGIBLE

FIG. 6A
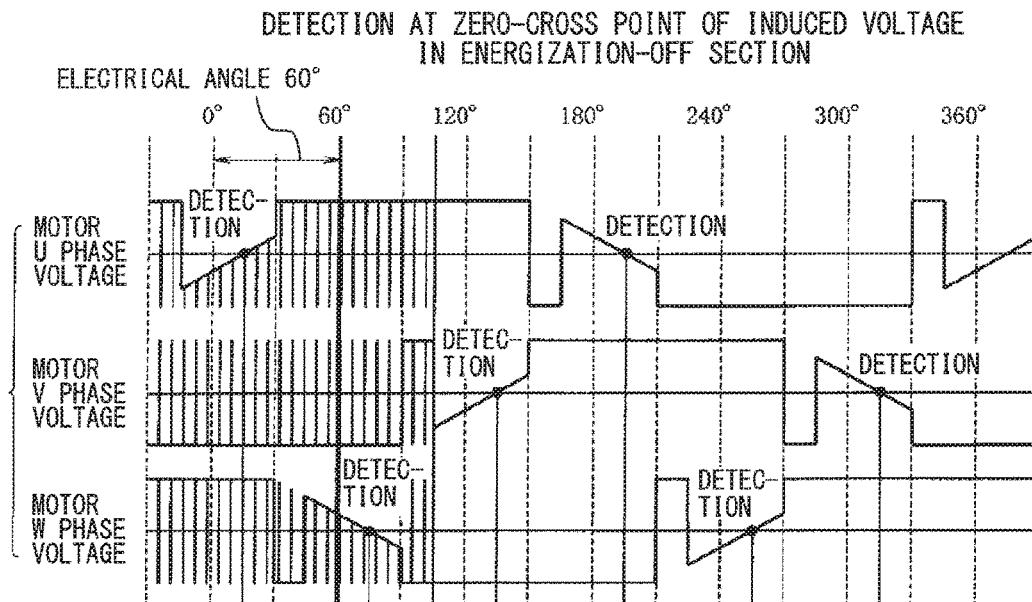
FIG. 6B
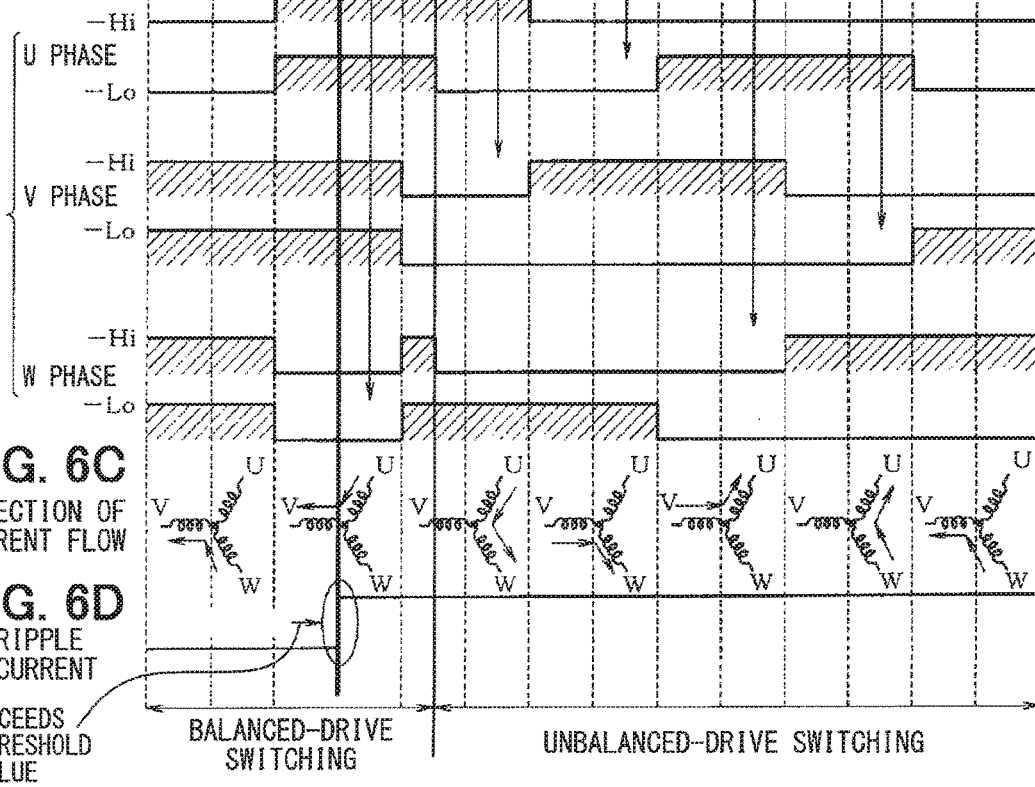
FIG. 6C
DIRECTION OF CURRENT FLOW
FIG. 6D
RIPPLE CURRENT
EXCEEDS THRESHOLD VALUE
BALANCED-DRIVE SWITCHING
UNBALANCED-DRIVE SWITCHING

FIG. 12A TERMINAL VOLTAGE U
FIG. 12B COMPARATIVE SIGNAL Uc
FIG. 12C PHASE SIGNAL Un
FIG. 12D 60° MEASURING TIMER / DETERMINE COMMUTATION TIMING / MASKING PERIOD
FIG. 12E BALANCED-DRIVE SWITCHING PERIOD
FIG. 12F COMMUNICATION SIGNAL U+ U−

MOTOR CONTROL DEVICE AND MOTOR CONTROL METHOD

CROSS REFERENCE TO RELATED APPLICATIONS

This application is the U.S. national phase of International Patent Application No. PCT/JP2014/005902 filed on Nov. 26, 2014 and is based on Japanese Patent Application No. 2013-254968 filed on Dec. 10, 2013, the disclosures of which are incorporated herein by reference.

TECHNICAL FIELD

The present disclosure relates to a motor control device and a motor control method which controls a brushless DC motor in a PWM manner via an inverter circuit according to a position-sensorless method.

BACKGROUND ART

It is deemed that the period of ringing caused by switching becomes longer than the pulse width of a PWM signal in a control region in which the duty ratio of the PWM signal is decreased when a brushless DC motor is controlled in a pulse width modulation (PWM) manner, and driven according to a position-sensorless method. In this case, the rotational angle of a rotor cannot be accurately detected, which is a problem.

Patent Literature 1 discloses technology (referred to as "balanced-drive switching") by which switching devices positioned on upper and lower arms of energizing phases in an inverter circuit are exclusively ON-OFF controlled so as to suppress a change in neutral point potential and to reduce common mode noise. According to this technology, when switching is not performed, the terminal voltage of a winding contains only an induced voltage. Accordingly, the rotational angle of the rotor can be stably detected even in the control region in which the duty ratio of the PWM signal is decreased.

In contrast, when the balanced-drive switching is adopted, a ripple current is increased in an operating region in which a motor rotates at a high speed. An increase in the capacity of a smoothing electrolytic capacitor is required to suppress the occurrence of the ripple current, and thus a circuit size is increased, which is a problem.

PRIOR ART LITERATURES

Patent Literature

Patent Literature 1: Japanese Patent No. 4513863

SUMMARY OF INVENTION

It is an object of the present disclosure to provide a motor control device and a motor control method in which the rotational position of a rotor can be stably detected according to a position-sensorless method without an increase in a ripple current.

According to a first aspect of the present disclosure, a motor control device that controls a brushless DC motor in a PWM control manner using an inverter circuit according to a position-sensorless method, includes: a ripple current estimating device configured to estimate a magnitude of a ripple current based on current flowing through a drive power supply line of the inverter circuit; and a control device. The inverter circuit includes a first output terminal and a second output terminal respectively corresponding to two energizing phases of the inverter circuit. When the magnitude of the ripple current is less than or equal to a threshold value, the control device performs balanced-drive switching that the first output terminal is repeatedly and alternately connected to a high voltage side and a low voltage side of a drive power supply, and the second output terminal, in an opposite way of the first output terminal, is repeatedly and alternately connected to the low voltage side and the high voltage side of the drive power supply. When the magnitude of the ripple current exceeds the threshold value, the control device performs unbalanced-drive switching that the first output terminal is repeatedly and alternately connected to the high voltage side and the low voltage side, and the second output terminal is connected only to the low voltage side.

In this configuration, when the rotational speed of the motor is low, and the ripple current is low, balanced-drive switching is performed such that the rotational position of the rotor can be stably detected, and the occurrence of switching noise in the inverter circuit can be suppressed. Since a switching pattern is switched to perform unbalanced-drive switching when the rotational speed of the motor is increased and the ripple current is increased to a certain level, the occurrence of the ripple current can be suppressed. As a result, when a small load is applied to the motor, position detectability can be improved. When a large load is applied, the occurrence of the ripple current can be suppressed, and thus an increase in the capacity of the smoothing capacitor is not required, and the size of the device including the inverter circuit can be reduced.

According to a second aspect of the present disclosure, a motor control device that controls a brushless DC motor in a PWM control manner using an inverter circuit according to a position-sensorless method, includes: a ripple current estimating device configured to estimate a magnitude of a ripple current based on current flowing through a drive power supply line of the inverter circuit; and a control device. The inverter circuit includes a first output terminal and a second output terminal respectively corresponding to two energizing phases of the inverter circuit. When the magnitude of the ripple current is less than or equal to a threshold value, the control device performs balanced-drive switching only during a predetermined time period that the first output terminal is repeatedly and alternately connected to a high voltage side and a low voltage side of a drive power supply, and the second output terminal, in an opposite way of the first output terminal, is repeatedly and alternately connected to the low voltage side and the high voltage side of the drive power supply, the predetermined time period being around a zero-cross point including a timing at which an induced voltage generated in a stator winding of the brushless DC motor is changed to pass through the zero-cross point. When the magnitude of the ripple current is less than or equal to the threshold value, the control device performs unbalanced-drive switching during a period other than the predetermined time period that the first output terminal is repeatedly and alternately connected to the high voltage side and the low voltage side, and the second output terminal is connected only to the low voltage side. When the magnitude of the ripple current exceeds the threshold value, the control device performs the unbalanced-drive switching during an entire time period.

In this configuration, when the rotational speed of the motor is low, and the ripple current is low, balanced-drive switching is performed such that the rotational position of the rotor can be stably detected, and the occurrence of switching noise in the inverter circuit can be suppressed. Since a switching pattern is switched to perform unbalanced-drive switching when the rotational speed of the motor is increased and the ripple current is increased to a certain level, the occurrence of the ripple current can be suppressed. As a result, when a small load is applied to the motor, position detectability can be improved. When a large load is applied, the occurrence of the ripple current can be suppressed, and thus an increase in the capacity of the smoothing capacitor is not required, and the size of the device including the inverter circuit can be reduced.

According to a third aspect of the present disclosure, a motor control method for controlling a brushless DC motor in a PWM control manner using an inverter circuit according to a position-sensorless method, includes: estimating a magnitude of a ripple current based on current flowing through a drive power supply line of the inverter circuit, wherein the inverter circuit includes a first output terminal and a second output terminal respectively corresponding to two energizing phases of the inverter circuit; when the magnitude of the ripple current is less than or equal to a threshold value, performing balanced-drive switching that the first output terminal is repeatedly and alternately connected to a high voltage side and a low voltage side of a drive power supply, and the second output terminal, in an opposite way of the first output terminal, is repeatedly and alternately connected to the low voltage side and the high voltage side of the drive power supply; and when the magnitude of the ripple current exceeds the threshold value, performing unbalanced-drive switching that the first output terminal is repeatedly and alternately connected to the high voltage side and the low voltage side, and the second output terminal is connected only to the low voltage side.

In this configuration, when the rotational speed of the motor is low, and the ripple current is low, balanced-drive switching is performed such that the rotational position of the rotor can be stably detected, and the occurrence of switching noise in the inverter circuit can be suppressed. Since a switching pattern is switched to perform unbalanced-drive switching when the rotational speed of the motor is increased and the ripple current is increased to a certain level, the occurrence of the ripple current can be suppressed. As a result, when a small load is applied to the motor, position detectability can be improved. When a large load is applied, the occurrence of the ripple current can be suppressed, and thus an increase in the capacity of the smoothing capacitor is not required, and the size of the device including the inverter circuit can be reduced.

According to a fourth aspect of the present disclosure, a motor control method for controlling a brushless DC motor in a PWM control manner using an inverter circuit according to a position-sensorless method, includes: estimating a magnitude of a ripple current based on current flowing through a drive power supply line of the inverter circuit, wherein the inverter circuit includes a first output terminal and a second output terminal respectively corresponding to two energizing phases of the inverter circuit; when the magnitude of the ripple current is less than or equal to a threshold value, performing balanced-drive switching only during a predetermined time period that the first output terminal is repeatedly and alternately connected to a high voltage side and a low voltage side of a drive power supply, and the second output terminal, in an opposite way of the first output terminal, is repeatedly and alternately connected to the low voltage side and the high voltage side of the drive power supply, the predetermined time period being around a zero-cross point including a timing at which an induced voltage generated in a stator winding of the brushless DC motor is changed to pass through the zero-cross point; when the magnitude of the ripple current is less than or equal to the threshold value, performing unbalanced-drive switching during a period other than the predetermined time period that the first output terminal is repeatedly and alternately connected to the high voltage side and the low voltage side, and the second output terminal is connected only to the low voltage side; and when the magnitude of the ripple current exceeds the threshold value, performing the unbalanced-drive switching during an entire time period.

In this configuration, when the rotational speed of the motor is low, and the ripple current is low, balanced-drive switching is performed such that the rotational position of the rotor can be stably detected, and the occurrence of switching noise in the inverter circuit can be suppressed. Since a switching pattern is switched to perform unbalanced-drive switching when the rotational speed of the motor is increased and the ripple current is increased to a certain level, the occurrence of the ripple current can be suppressed. As a result, when a small load is applied to the motor, position detectability can be improved. When a large load is applied, the occurrence of the ripple current can be suppressed, and thus an increase in the capacity of the smoothing capacitor is not required, and the size of the device including the inverter circuit can be reduced.

BRIEF DESCRIPTION OF DRAWINGS

The above and other objects, features and advantages of the present disclosure will become more apparent from the following detailed description made with reference to the accompanying drawings. In the drawings:

FIGS. 5A to 5C are views illustrating an expression for calculating a ripple current;

FIGS. 6A to 6D show a timing chart illustrating signal waveforms;

FIGS. 12A to 12F show a timing chart illustrating signal waveforms in a fourth embodiment.

EMBODIMENTS FOR CARRYING OUT INVENTION (First Embodiment)

Figure 1:
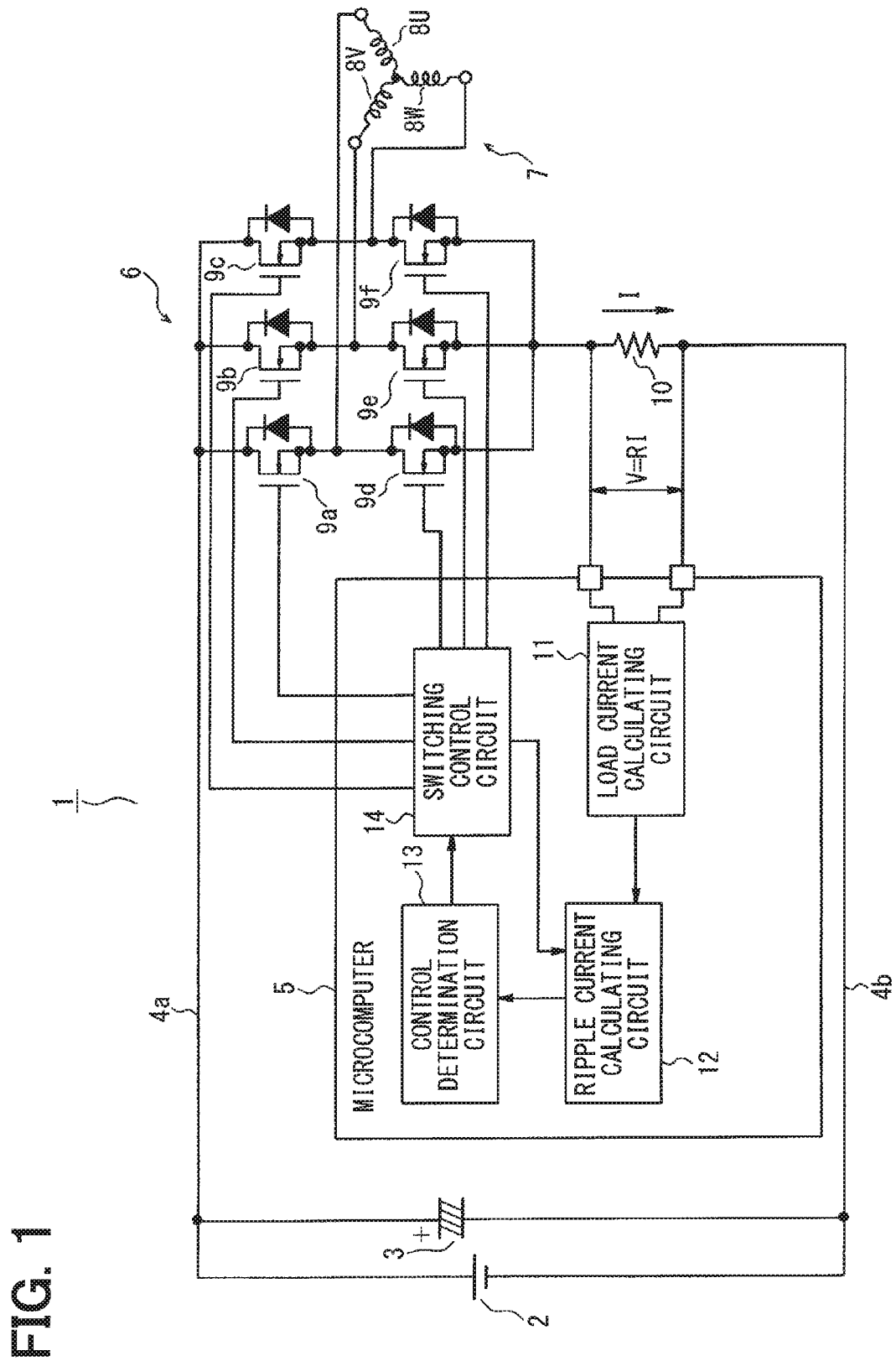
FIG. 1 is a functional block diagram illustrating the configuration of an inverter device in a first embodiment.

As illustrated in FIG. 1, an inverter device 1 is configured to be connected to a parallel circuit of a DC power supply (drive power supply) 2 and a smoothing capacitor (electrolytic capacitor) 3 via power supply lines (drive power supply lines) 4a and 4b. The inverter device 1 is configured to include a microcomputer (control device) 5 and an inverter circuit 6. Stator windings 8U, 8V, and 8W of a brushless DC motor 7 (hereinafter, simply referred to as a motor) are respectively connected to a U phase output terminal, a V phase output terminal, and a W phase output terminal of the inverter circuit 6. The respective one ends of the stator windings 8U, 8V, and 8W are connected together (star connection). For example, the motor 7 is an air-blowing fan motor mounted in a vehicle.

The inverter circuit 6 is configured such that six N-channel MOSFETs (switching devices) 9a to 9f are connected to each other in a three-phase bridge configuration. A freewheel diode (parasitic diode) is connected between a drain and a source of each N-channel MOSFET 9. A resistance element (current detection device) 10 is inserted into the power supply line 4b, and both ends of the resistance element 10 are respectively connected to input terminals of the microcomputer 5.

The microcomputer 5 includes a load current calculating circuit 11; a ripple current calculating circuit (ripple current estimating device) 12; a control determination circuit (control device) 13; and a switching control circuit (control device) 14. The load current calculating circuit 11 includes a built-in A/D converter. The load current calculating circuit 11 performs A/D conversion on a terminal voltage V of the resistance element 10, and outputs a result of the conversion to the ripple current calculating circuit 12. The ripple current calculating circuit 12 calculates a ripple current contained in a load current I, based on the load current I (current flowing through the resistance element 10) obtained from the terminal voltage V and a duty ratio Duty of PWM control performed by the switching control circuit 14, and outputs the calculated ripple current to the control determination circuit 13.

The control determination circuit 13 compares the input ripple current with a predetermined threshold value, and outputs a switching signal to the switching control circuit 14 according to a result of the comparison. Similar to Patent Literature 1, the inverter device 1 compares the terminal voltages of the stator windings 8U, 8V, and 8W of the motor 7 with an imaginary neutral point voltage via comparators (not illustrated), and detects a zero-cross point of an induced voltage. An output signal of each phase comparator is input to the switching control circuit 14. The switching control circuit 14 generates a phasing signal (position detection signal) indicating a zero-cross timing of each phase based on each of the output signals. The switching control circuit 14 switches an energizing pattern for the N-channel MOSFET 9 of the inverter circuit 6 to another pattern based on the phasing signal.

The switching control circuit 14 generates a PWM signal for each phase by determining a duty ratio of PWM control according to a control command input from an external device, and comparing the duty ratio with the amplitude level of a carrier such as a triangle wave. The switching control circuit 14 outputs the PWM signals to gates of the N-channel MOSFETs 9a to 9f via a drive circuit (not illustrated). The switching control circuit 14 switches a switching pattern, which is used in PWM control, between balanced-drive switching and unbalanced-drive switching according to the switching signal input from the control determination circuit 13.

Figure 2B:
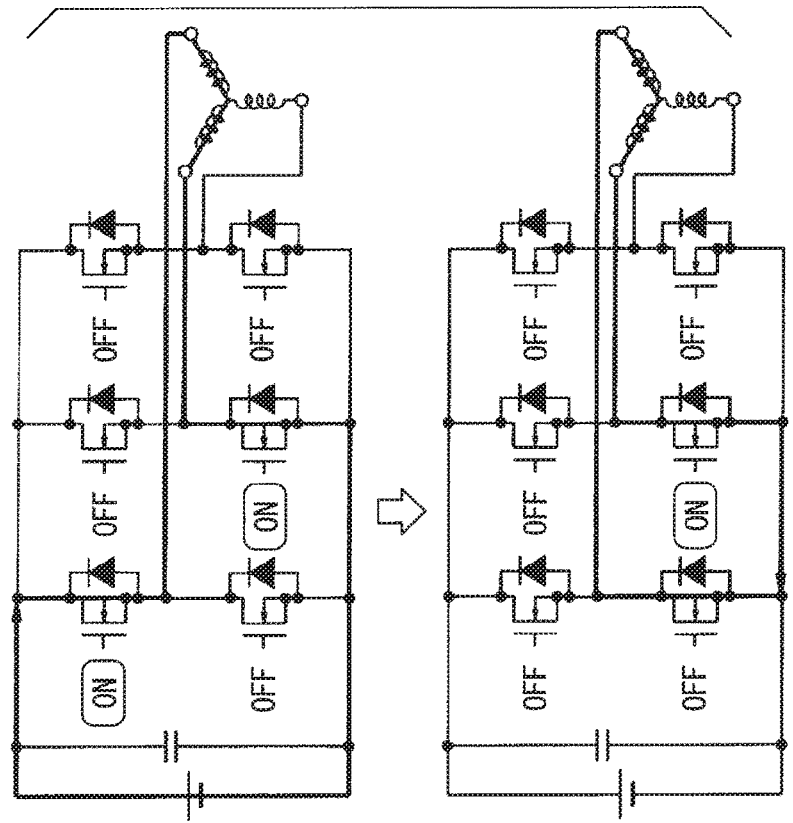
FIG. 2B shows diagrams, each illustrating the ON/OFF state of each element and a current path in the inverter circuit in unbalanced-drive switching.
Figure 2A:
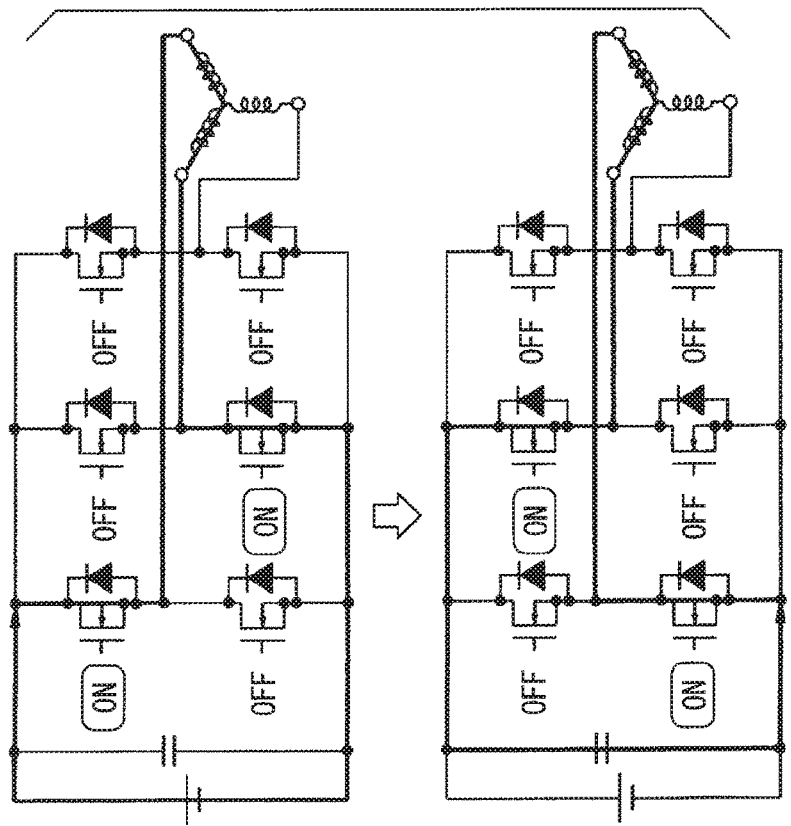
FIG. 2A shows diagrams, each illustrating the ON/OFF state of each element and a current path in an inverter circuit in balanced-drive switching.

As illustrated in FIG. 2A, during the balanced-drive switching, when an upper arm side U phase is energized, and then a lower arm side V phase is energized, only the N-channel MOSFETs 9a and 9e are turned on. At this time, current flows through a path from the DC power supply 2 (+), to the N-channel MOSFET 9a, to the winding 8U, to the winding 8V, to the N-channel MOSFET 9e, and then to the DC power supply 2 (−).

This state is switched to a state in which only the N-channel MOSFETs 9b and 9d are turned on. At this time, current flows through a path from the winding 8U, to the winding 8V, to the N-channel MOSFET 9b, to the smoothing capacitor 3, to the N-channel MOSFET 9d, and then to the winding 8U. That is, the turn-on phases are alternately switched in a sequence of (U+, V−), (U−, V+), (U+, V−), (U−, V+), . . . In other words, a V phase output terminal of the inverter circuit 6 is alternately connected to a negative terminal and a positive terminal of the DC power supply 2 in accordance with when a U phase output terminal of the inverter circuit 6 is alternately connected to the positive terminal and the negative terminal of the DC power supply 2.

In contrast, as illustrated in FIG. 2B, during the unbalanced-drive switching, only the N-channel MOSFETs 9a and 9e are turned on, and this state is switched to a state in which only the N-channel MOSFET 9e is turned on. At this time, current flows through a path from the winding 8U, to the winding 8V, to the N-channel MOSFET 9e, to a diode of the N-channel MOSFET 9d, and then to the winding 8U, and unlike the balanced-drive switching, a regenerative current does not flow through the smoothing capacitor 2. That is, the turn-on phases are alternately switched in a sequence of (U+, V−), (V−), (U+, V−), (V−), . . . In other words, the U phase output terminal of the inverter circuit 6 is alternately connected to the positive terminal and the negative terminal of the DC power supply 2, and in contrast, the V phase output terminal of the inverter circuit 6 is connected only to the negative terminal of the DC power supply 2.

Figure 3:
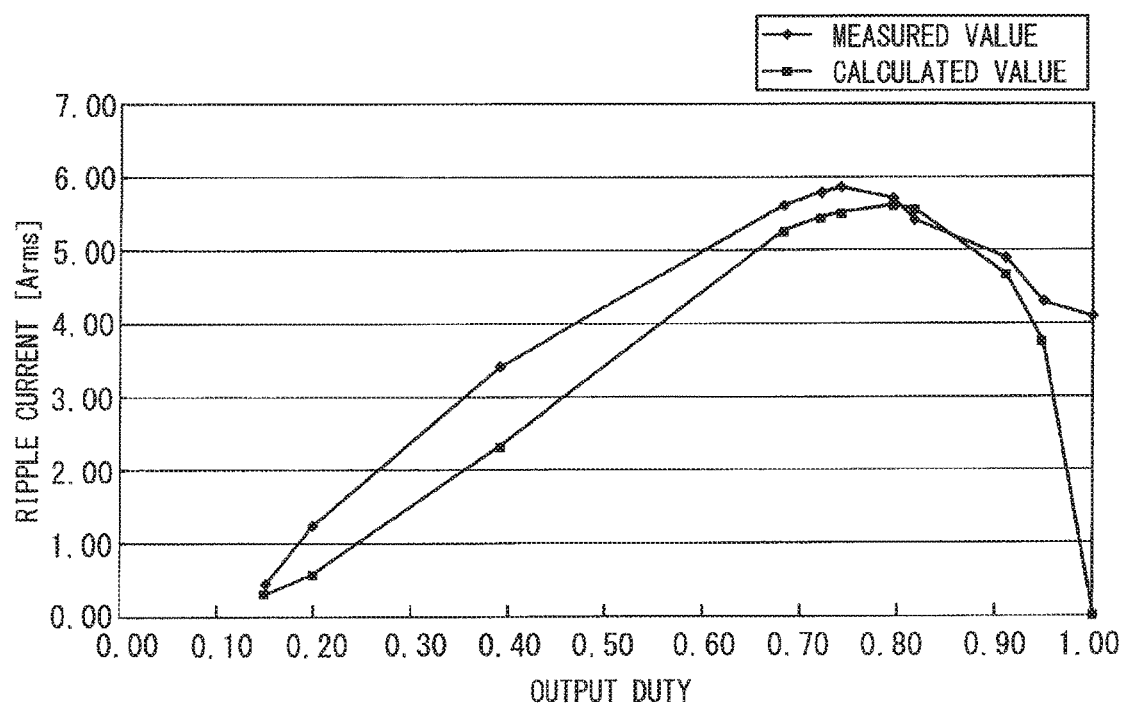
FIG. 3 is a graph illustrating an example of a relationship between a PWM duty ratio and a ripple current in terms of a theoretical value and a measured value in balanced-drive switching.

As illustrated in FIG. 3, when PWM control is performed in a balanced-drive switching pattern, the calculated value of a ripple current indicates a peak value at a duty of 80%. Thereafter, the calculated value is decreased to zero until a duty of 100% is reached, and in contrast, the measured value is only decreased to 4 A (effective value).

Figure 4:
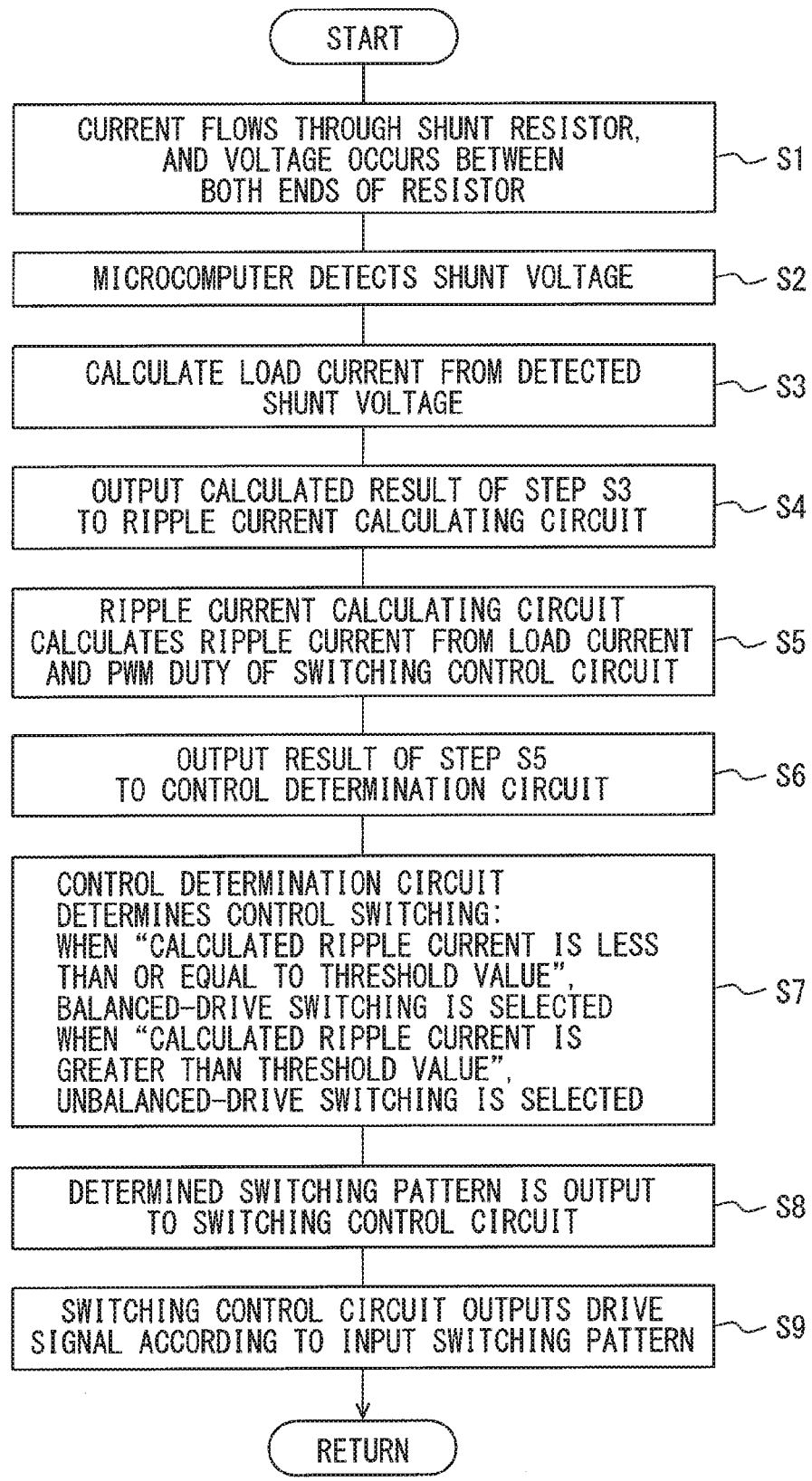
FIG. 4 is a flowchart illustrating contents of control performed by a microcomputer and a time series of occurring events.

Hereinafter, an operation in the present embodiment will be described. As illustrated in FIG. 4, when current flows through the resistance element (shunt resistor) 10, the voltage V occurs between both ends of the resistance element 10 (S1). The flowchart in FIG. 4 illustrates not only a process sequence but also events occurring in time series. The microcomputer 4 reads the terminal voltage (shunt voltage) V, performs A/D conversion on the read terminal voltage V (S2), and calculates the load current I by dividing the read terminal voltage V by a resistance value R of the resistance element 10 via the load current calculating circuit 11 (S3). The calculated load current I is output to the ripple current calculating circuit 12 (S4). A ripple current Ir (effective value) occurring in the smoothing capacitor 3 is calculated by the following expression (S5).

$$Ir = I \times \sqrt{\{Duty \times (1-Duty)\}} \quad (1)$$

Expression (1) is obtained from an expression for calculating the effective value of a ripple current $Icin\_rms$ occurring in an input side capacitor Cin in a model of a step-down DC/DC converter as illustrated in FIGS. 5A to 5C. A ripple current flowing through an input side coil is negligible.

The calculated ripple current Ir is output to the control determination circuit 13 (S6). The control determination circuit 13 compares the ripple current Ir with a predetermined threshold value, and selects a balanced-drive switching pattern when the ripple current Ir is less than or equal to the threshold value. In contrast, when the ripple current Ir is greater than the threshold value, the control determination circuit 13 selects an unbalanced-drive switching pattern (S7). A switching signal according to a selected (determined) switching pattern is output to the switching control circuit 14 (S8). The switching control circuit 14 executes either a balanced-drive switching pattern or an unbalanced-drive switching pattern (S9) according to the switching signal.

Figure 7:
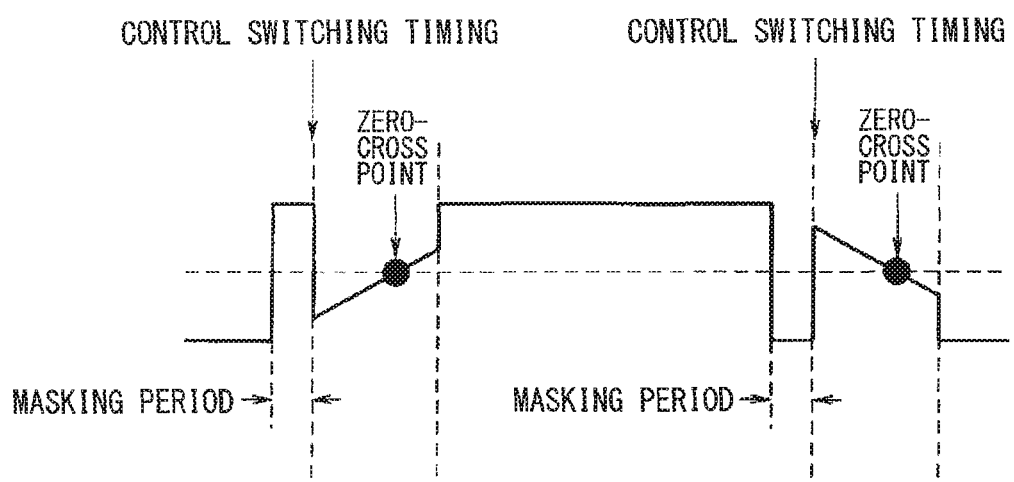
FIG. 7 is a graph illustrating control switching timings in a terminal voltage waveform of a stator winding.

As illustrated from FIGS. 6A to 6D, when the ripple current exceeds the threshold value in the balanced-drive switching pattern (refer to FIG. 6D), the switching pattern is switched to the unbalanced-drive switching pattern at a subsequent control switching timing. As illustrated in FIG. 7, a masking period, which is used to mask a period during which a freewheeling current flows through a diode of the N-channel MOSFET 9, is started at the edge of a phase signal for each phase which appears every electrical angle of 60 degrees. The control switching timing is set to a point in time after the masking period has elapsed (refer to a fourth embodiment for a detailed description of this timing).

In the present embodiment, the ripple current calculating circuit 12 of the microcomputer 5 estimates the magnitude of the ripple current Ir contained in current flowing through the power supply line 4b of the inverter circuit 6. When the magnitude of the ripple current Ir is less than or equal to the threshold value, the switching control circuit 14 performs balanced-drive switching by which one of the output terminals corresponding to two energizing phases, that is, an upper side energizing phase and a lower side energizing phase of the inverter circuit 6 is repeatedly alternately connected to the positive terminal (high voltage side) and the negative terminal (low voltage side) of the DC power supply 2, and the other of the output terminals is repeatedly alternately connected to the negative terminal and the positive terminal. When the magnitude of the ripple current Ir exceeds the threshold value, the switching control circuit 14 performs unbalanced-drive switching by which the one of the output terminals is alternately connected to the high voltage side and the low voltage side, and the other of the output terminals is connected only to the negative terminal.

In this configuration, when the rotational speed of the motor 7 is low, and the ripple current Ir is low, balanced-drive switching is performed such that the rotational position of the rotor can be stably detected, and the occurrence of switching noise in the inverter circuit 6 can be suppressed. Since the switching pattern is switched to perform unbalanced-drive switching when the rotational speed of the motor 7 is increased and the ripple current Ir is increased to a certain level, the occurrence of the ripple current can be suppressed. As a result, when a small load is applied to the motor 7, position detectability can be improved. When a large load is applied, the occurrence of the ripple current can be suppressed, and thus an increase in the capacity of the smoothing capacitor 3 is not required, and the size of the device including the inverter circuit 6 can be reduced.

Since the switching control circuit 14 performs switching between the balanced-drive switching and the unbalanced-drive switching synchronously with every electrical angle of 60 degrees at which the energizing pattern for the inverter circuit 6 is switched, the switching pattern can be smoothly switched in accordance with the switching of the energizing pattern.

The ripple current calculating circuit 12 detects current flowing through the power supply line 4b via the resistance element 10, and estimates the magnitude of the ripple current Ir based on the detected current according to Expression (1). Accordingly, the ripple current Ir can be properly estimated while the duty ratio Duty in PWM control is taken into consideration.

(Second Embodiment)

Figure 8:
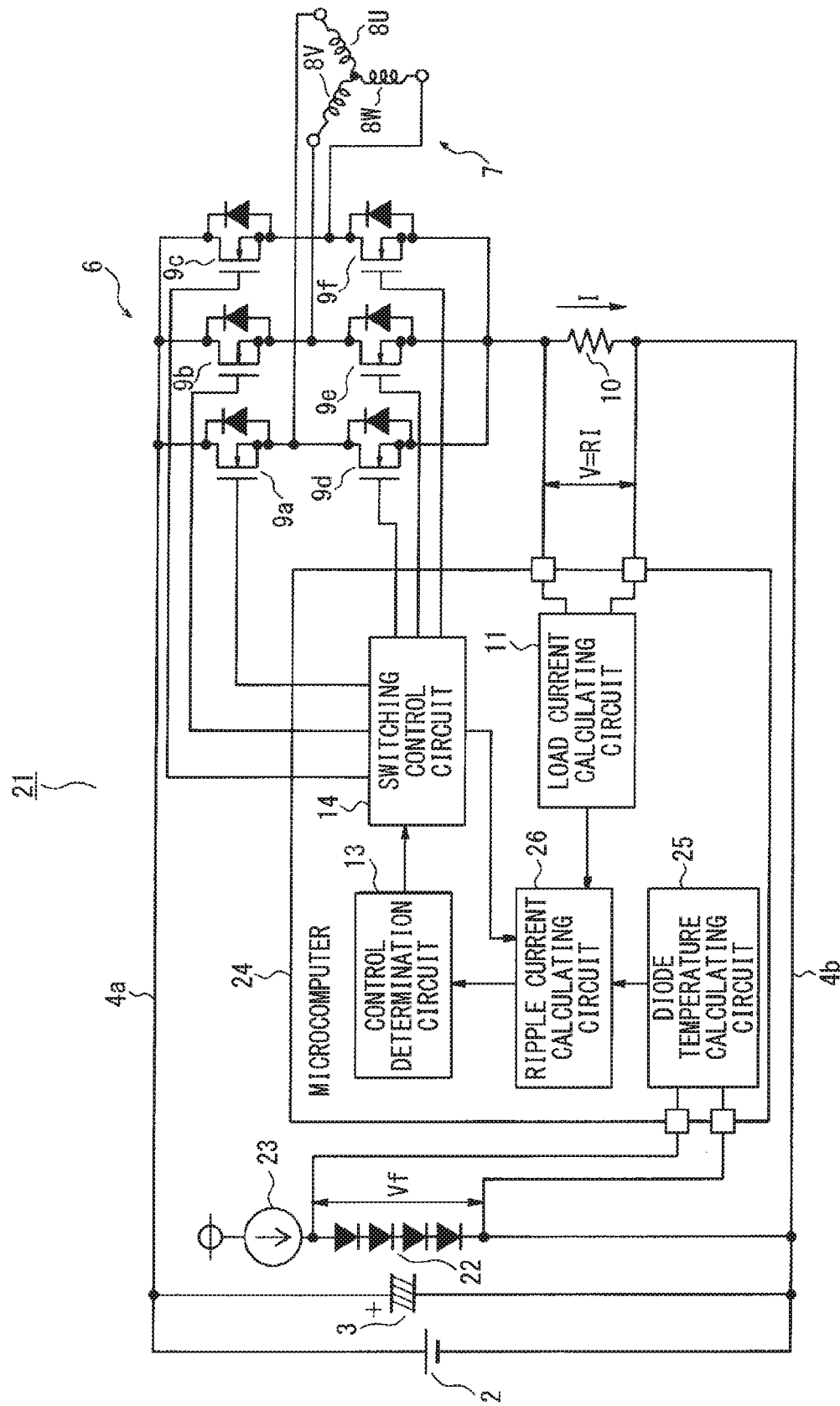
FIG. 8 is a functional block diagram illustrating the configuration of an inverter device in a second embodiment.

Hereinafter, the same reference signs will be assigned to the same portions as in the first embodiment. The same portions will not be described, and different portions will be described. As illustrated in FIG. 8, in an inverter device 21 in a second embodiment, a diode circuit (temperature detection device and ripple current estimating device) 22, in which multiple diodes are connected in series to each other, is disposed in the vicinity of a smoothing capacitor 3 so as to detect the temperature of the smoothing capacitor 3. The diode circuit 22 is connected in series to a current source 23, which is disposed on an anode side of the diode circuit 22, between the power supply and the ground.

A microcomputer 24 replacing the microcomputer 5 includes a diode temperature calculating circuit (temperature estimating device and ripple current estimating device) 25. The diode temperature calculating circuit 25 reads the terminal voltage of the diode circuit 22, that is, a voltage Vf which is a sum of forward voltages of the multiple diodes, and performs A/D conversion on the voltage Vf. The diode temperature calculating circuit 25 obtains the internal temperature of the smoothing capacitor 3 based on a result of the conversion according to a conversion expression or the like indicating a correlation between the conversion result and the internal temperature. The diode temperature calculating circuit 25 outputs the obtained internal temperature to a ripple current calculating circuit (ripple current estimating device) 26 replacing the ripple current calculating circuit 12. The ripple current calculating circuit 26 calculates a ripple current based on the load current I and the voltage Vf, and outputs the calculated ripple current to the control determination circuit 13.

Figure 9:
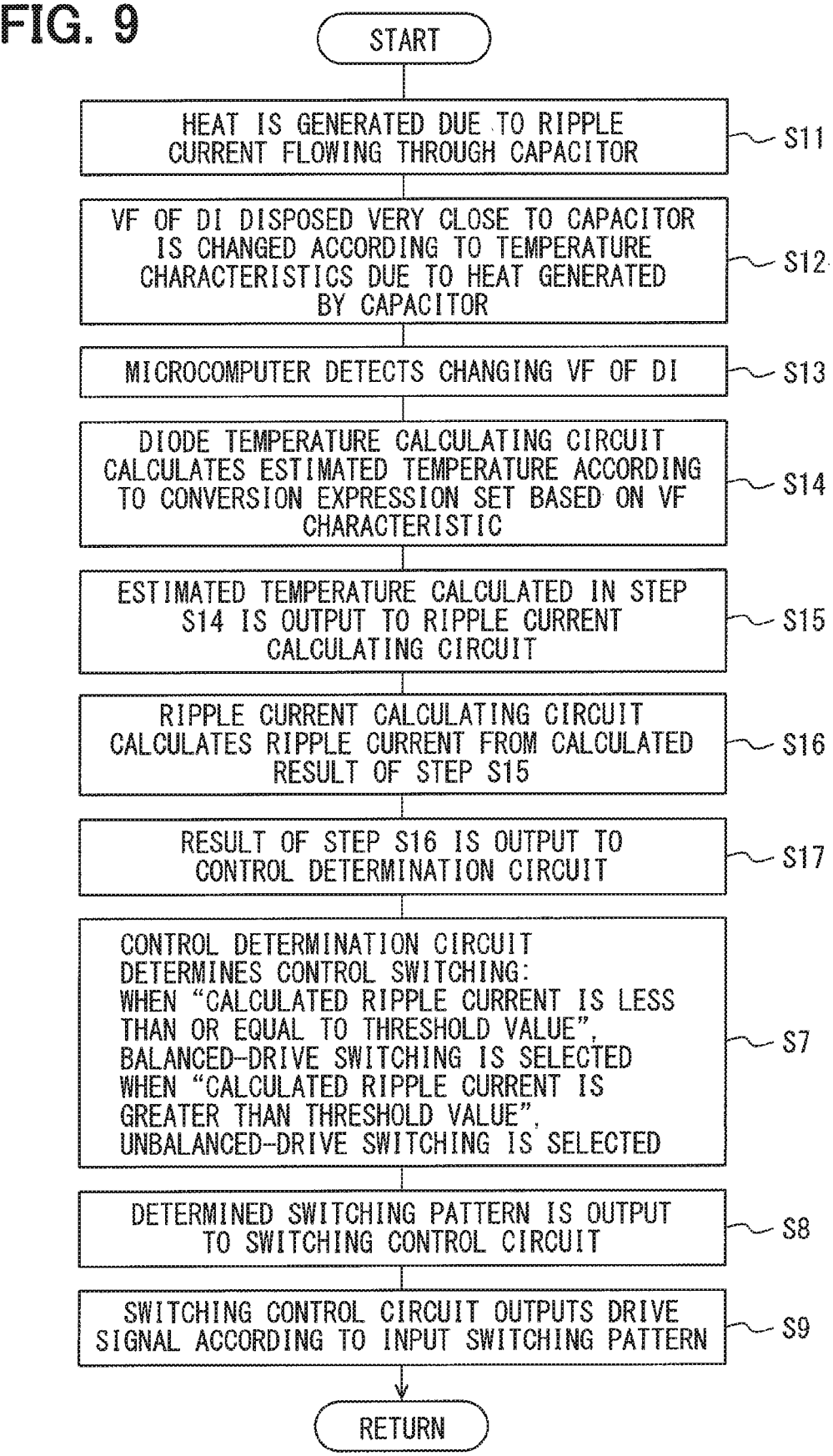
FIG. 9 is a flowchart illustrating contents of control performed by a microcomputer and a time series of occurring events in the second embodiment.

Hereinafter, an operation in the second embodiment will be described. Steps S1 to S4 illustrated in FIG. 4 are omitted from FIG. 9; however, these steps are executed similar to the first embodiment. When the smoothing capacitor 3 generates heat due to a ripple current flowing thereinto (S11), the terminal voltage Vf of the diode circuit (Di) 22 is changed due to the generated heat (S12). That is, the terminal voltage Vf is decreased along with an increase in the temperature of the smoothing capacitor 3.

When the microcomputer 24 reads the terminal voltage Vf (S13), and estimates the internal temperature of the smoothing capacitor 3 via the diode temperature calculating circuit 25 (S14), the diode temperature calculating circuit 25 outputs the estimated temperature to the ripple current calculating circuit 26 (S15). As described above, the ripple current calculating circuit 26 calculates a ripple current based on the load current I and the voltage Vf (S16), and outputs the calculated ripple current to the control determination circuit 13 (S17). Subsequently, steps S7 to S9 are executed similar to the first embodiment.

As described above, in the second embodiment, when the diode circuit 22 detects the temperature of the smoothing capacitor 3, the diode temperature calculating circuit 25 estimates the internal temperature of the smoothing capacitor 3 based on the detected temperature, and the ripple current calculating circuit 26 estimates the magnitude of a ripple current based on the estimated temperature and the load current I. Accordingly, the magnitude of the ripple current can be properly estimated according to the internal temperature of the smoothing capacitor 3.

A diode used as a temperature detection device is not limited to the diode circuit 22 in which multiple elements are connected in series to each other, and only one element may be used as a diode. However, when the diode circuit 22 including multiple elements is used, a change in the terminal voltage Vf is increased, and thus the accuracy of detecting the temperature is improved.

(Third Embodiment)

Figure 10:
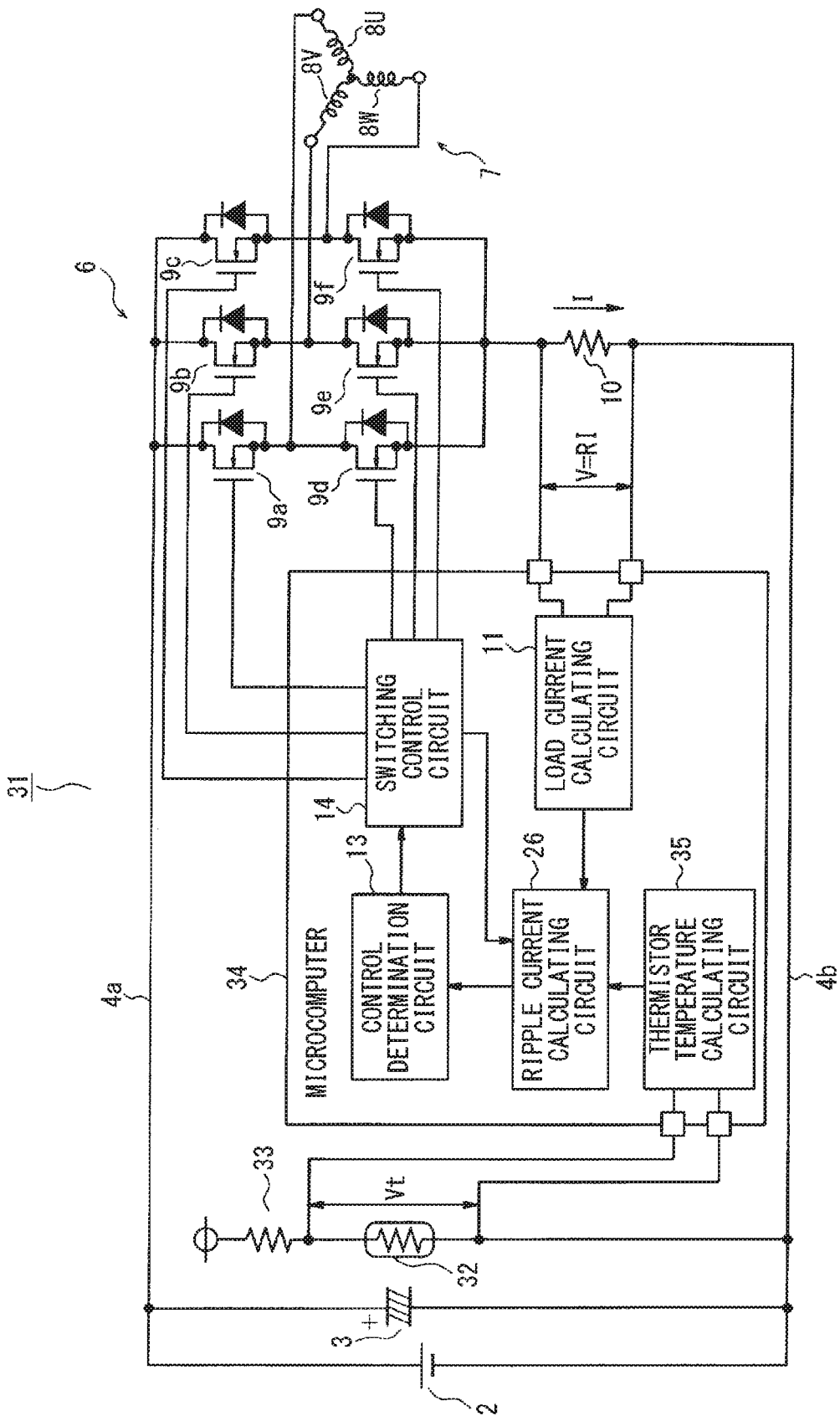
FIG. 10 is a functional block diagram illustrating the configuration of an inverter device in a third embodiment.

Hereinafter, the points of difference of a third embodiment with reference to the second embodiment will be described. As illustrated in FIG. 10, in an inverter device 31 in the third embodiment, a thermistor (temperature detection device and ripple current estimating device) 32 is disposed in the vicinity of a smoothing capacitor 3 so as to detect the temperature of the smoothing capacitor 3. The thermistor 32 is connected in series to a resistance element 33 between the power supply and the ground.

A microcomputer 34 replacing the microcomputer 5 includes a thermistor temperature detecting circuit (temperature estimating device and ripple current estimating device) 35 replacing the diode temperature calculating circuit 25. The thermistor temperature calculating circuit 35 reads a terminal voltage Vt of the thermistor 32, and performs A/D conversion on the terminal voltage Vt. The thermistor temperature calculating circuit 35 obtains the internal temperature of the smoothing capacitor 3 based on a result of the conversion according to a conversion expression or the like indicating a correlation between the conversion result and the internal temperature. The thermistor temperature calculating circuit 35 outputs the obtained internal temperature to the ripple current calculating circuit 26.

Figure 11:
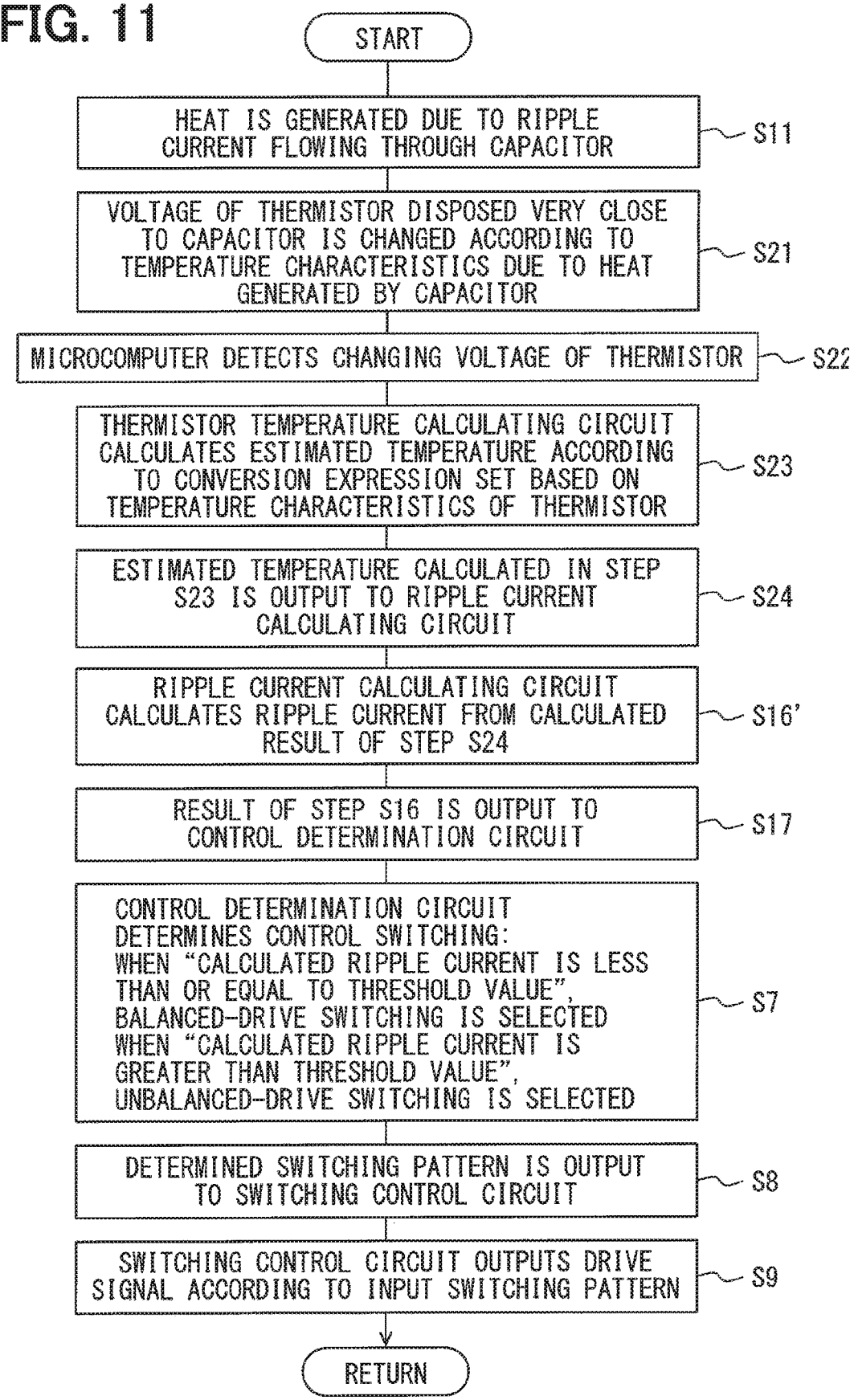
FIG. 11 is a flowchart illustrating contents of control performed by a microcomputer and a time series of occurring events in the third embodiment.

Hereinafter, an operation in the third embodiment will be described. As illustrated in FIG. 11, when the smoothing capacitor 3 generates heat (S11), the terminal voltage Vt of the thermistor 32 is changed due to the generated heat (S21). That is, the terminal voltage Vt is decreased along with an increase in the temperature of the smoothing capacitor 3 (when the thermistor 32 has a negative temperature coefficient).

When the microcomputer 34 reads the terminal voltage Vt (S22), and estimates the internal temperature of the smoothing capacitor 3 via the thermistor temperature calculating circuit 35 (S23), the thermistor temperature calculating circuit 35 outputs the estimated temperature to the ripple current calculating circuit 26 (S24). Subsequently, steps S16' to S9 are executed similar to the second embodiment (a calculation result of step S24 is used in step S16').

As described above, in the third embodiment, when the thermistor 32 detects the temperature of the smoothing capacitor 3, the thermistor temperature calculating circuit 35 estimates the internal temperature of the smoothing capacitor 3 based on the detected temperature, and the ripple current calculating circuit 26 estimates the magnitude of a ripple current based on the estimated temperature and the load current I. Accordingly, similar to the second embodiment, the magnitude of the ripple current can be properly estimated according to the internal temperature of the smoothing capacitor 3.

(Fourth Embodiment)

In a fourth embodiment, when the magnitude of the ripple current Ir is less than or equal to the threshold value, a period for performing balanced-drive switching is reduced. As illustrated in FIGS. 12A to 12F, a comparator outputs a comparative signal Uc (refer to FIG. 12B) based on the terminal voltage (refer to FIG. 12A) of the U-phase stator winding 8U. Correction is performed to remove a freewheeling current period contained in the comparative signal Uc, and a phasing signal Un is generated (refer to FIG. 12C). A timer for measuring the period of an electrical angle of 60 degrees, a timer for determining a commutation timing, a timer for setting a masking period for a freewheeling current period, and the like are operated at the rising edge and the falling edge of a phasing signal for each phase (refer to FIG. 12D).

Accordingly, as illustrated in FIG. 12F, energizing signals for the U phase are generated and output, and as illustrated in FIG. 12E, a balanced-drive switching period when the ripple current Ir is less than or equal to the threshold value is set. That is, in the first embodiment, balanced-drive switching is performed during the entire period in which a ripple current is less than or equal to the threshold value. In contrast, in the fourth embodiment, balanced-drive switching is performed only during a predetermined period around a zero-cross point.

Specifically, the down counting of the masking period counter illustrated by the alternate one long and one short dashed line in FIG. 12D is started at a start timing of the period of an electrical angle of 60 degrees. When a counter value becomes zero, the masking period is ended, and balanced-drive switching is started. When a predetermined amount of time based on the counter value of the masking period counter has elapsed after a start timing of the period of an electrical angle of 60 degrees is reached, the balanced-drive switching is ended.

An execution period of the balanced-drive switching illustrated in FIG. 12E is applied to switching between the V phase and the W phase. The bidirectional arrow in FIG. 12E indicates the maximum "predetermined period of time around a zero-cross point, which contains a timing at which an induced voltage is changed to pass through the zero-cross point". That is, the "maximum predetermined period of time" refers to a time period from when a freewheeling current becomes zero to when the energization of the relevant phase is started.

Since one purpose of performing balanced-drive switching is to increase a period in which the zero-cross point can be detected, this purpose can be achieved by performing balanced-drive switching only during the predetermined period of time around the zero-cross point. As described above, when the ripple current exceeds the threshold value, similar to the first embodiment, the switching pattern is switched to perform unbalanced-drive switching even during the period for performing balanced-drive switching.

As described above, in the fourth embodiment, the switching control circuit 12 performs balanced-drive switching, which is performed when the ripple current Ir is less than or equal to the threshold value, only during the predetermined period of time around the zero-cross point, which contains the timing at which an induced voltage occurring in the stator winding 8 of the motor 7 is changed to pass through the zero-cross point. The switching control circuit 12 performs unbalanced-drive switching at a period other than the predetermined period of time. When the magnitude of the ripple current Ir exceeds the threshold value, the switching pattern is switched to perform unbalanced-drive switching during the entire period of time. Accordingly, when the ripple current Ir is low, the period for performing balanced-drive switching is considerably reduced, and thus the increasing period of the ripple current can be reduced while securing the period in which the zero-cross point can be detected.

The present disclosure is not limited only to the embodiments described above or illustrated in the drawings, and the embodiments can be modified or expanded in the following manner.

For example, in the balanced-drive switching illustrated in FIG. 2B, the N-channel MOSFET 9*d* may be turned on during the period in which current flows through the parasitic diode of the N-channel MOSFIT 9*d*. Accordingly, the occurrence of a loss in the parasitic diode can be suppressed.

A current transformer may be used as a current detection device. The current of the power supply line 4*a* may be detected.

It is not necessarily required to synchronize the timing of switching between the balanced-drive switching pattern and the unbalanced-drive switching pattern with the timing of switching an energizing pattern to another pattern. The switching pattern may be switched when it is detected that a ripple current exceeds the threshold value.

A switching device is not limited to an N-channel MOSFET, and a P-channel MOSFET may be used on a positive side. A switching device is not limited to a MOSFET, and an IGBT, a bipolar transistor, or the like may be used.

The present disclosure may be applied to motors other than a fan motor.

In the drawings, 1 represents an inverter device, 2 represents a DC power supply (drive power supply), 3 represents a smoothing capacitor, 4 represents a power supply line (drive power supply line), 6 represents an inverter circuit, 7 represents a brushless DC motor, 10 represents a resistance element (current detection device), 12 represents a ripple current calculating circuit (ripple current estimating device), 13 represents a control determination circuit (control device), and 14 represents a switching control circuit (control device).

It is noted that a flowchart or the processing of the flowchart in the present application includes sections (also referred to as steps), each of which is represented, for instance, as S1. Further, each section can be divided into several subsections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A motor control device that controls a brushless DC motor by Pulse Width Modulation ("a PWM control manner") using an inverter circuit without a position sensor, the motor control device comprising:
   a ripple current estimating device configured to estimate a magnitude of a ripple current based on current flowing through a drive power supply line of the inverter circuit; and
   a control device, wherein:
   the inverter circuit includes a first output terminal and a second output terminal that are directly coupled to two energizing phases of the inverter circuit, respectively;
   when the magnitude of the ripple current is less than or equal to a threshold value, the control device performs balanced-drive switching that the first output terminal of the inverter circuit is repeatedly and alternately connected to a high voltage side and a low voltage side of a drive power supply, and the second output terminal of the inverter circuit, in an opposite way of the first output terminal, is repeatedly and alternately connected to the low voltage side and the high voltage side of the drive power supply; and
   when the magnitude of the ripple current exceeds the threshold value, the control device performs unbalanced-drive switching that the first output terminal of the inverter circuit is repeatedly and alternately connected to the high voltage side and the low voltage side, and the second output terminal of the inverter circuit is connected only to the low voltage side.

2. The motor control device according to claim 1, wherein:
   the control device performs switching between the balanced-drive switching and the unbalanced-drive switching synchronously with a timing of switching an energizing pattern of the inverter circuit to another pattern.

3. The motor control device according to claim 1, wherein:
   the ripple current estimating device includes a current detection device configured to detect the current flowing through the drive power supply line; and
   the current detection device estimates the magnitude of the ripple current based on a detected current.

4. The motor control device according to claim 3, wherein:
   the current detected by the current detection device, is defined as I;
   a duty ratio in the PWM control manner is defined as Duty;
   the magnitude of the ripple current is defined as Ir;
   the ripple current estimating device estimates the magnitude of the ripple current according to an equation of:

$$Ir = I \times \{Duty \times (1-Duty)\}^{1/2}.$$

5. The motor control device according to claim 3, wherein:
   the ripple current estimating device further includes a temperature estimating device configured to estimate an internal temperature of a smoothing capacitor connected in the drive power supply line; and
   the ripple current estimating device estimates the magnitude of the ripple current based on an estimated temperature and the current detected by the current detection device.

6. The motor control device according to claim 5, wherein:
   the temperature estimating device detects a temperature of the smoothing capacitor using a diode, and estimates the internal temperature of the smoothing capacitor based on a detected temperature.

7. The motor control device according to claim 5, wherein:
   the temperature estimating device detects a temperature of the smoothing capacitor using a thermistor, and estimates the internal temperature of the smoothing capacitor based on a detected temperature.

8. A motor control device that controls a brushless DC motors by Pulse Width Modulation ("a PWM control manner") using an inverter circuit without a position sensor, the motor control device comprising:
  a ripple current estimating device configured to estimate a magnitude of a ripple current based on current flowing through a drive power supply line of the inverter circuit; and
  a control device, wherein:
  the inverter circuit includes a first output terminal and a second output terminal that are directly coupled to two energizing phases of the inverter circuit, respectively;
  when the magnitude of the ripple current is less than or equal to a threshold value, the control device performs balanced-drive switching only during a predetermined time period that the first output terminal of the inverter circuit is repeatedly and alternately connected to a high voltage side and a low voltage side of a drive power supply, and the second output terminal of the inverter circuit, in an opposite way of the first output terminal, is repeatedly and alternately connected to the low voltage side and the high voltage side of the drive power supply, the predetermined time period being around a zero-cross point including a timing at which an induced voltage generated in a stator winding of the brushless DC motor is changed to pass through the zero-cross point;
  when the magnitude of the ripple current is less than or equal to the threshold value, the control device performs unbalanced-drive switching during a period other than the predetermined time period that the first output terminal of the inverter circuit is repeatedly and alternately connected to the high voltage side and the low voltage side, and the second output terminal of the inverter circuit is connected only to the low voltage side; and
  when the magnitude of the ripple current exceeds the threshold value, the control device performs the unbalanced-drive switching during an entire time period.

9. A motor control method for controlling a brushless DC motor by Pulse Width Modulation ("a PWM control manner") using an inverter circuit without a positon sensor, the motor control method comprising:
  estimating a magnitude of a ripple current based on current flowing through a drive power supply line of the inverter circuit, wherein the inverter circuit includes a first output terminal and a second output terminal that are directly coupled to two energizing phases of the inverter circuit, respectively;
  when the magnitude of the ripple current is less than or equal to a threshold value, performing balanced-drive switching that the first output terminal of the inverter circuit is repeatedly and alternately connected to a high voltage side and a low voltage side of a drive power supply, and the second output terminal of the inverter circuit, in an opposite way of the first output terminal, is repeatedly and alternately connected to the low voltage side and the high voltage side of the drive power supply; and
  when the magnitude of the ripple current exceeds the threshold value, performing unbalanced-drive switching that the first output terminal of the inverter circuit is repeatedly and alternately connected to the high voltage side and the low voltage side, and the second output terminal of the inverter circuit is connected only to the low voltage side.

10. The motor control method according to claim 9, further comprising:
  performing a switching between the balanced-drive switching and the unbalanced-drive synchronously with a timing of switching an energizing pattern of the inverter circuit to another pattern.

11. The motor control method according to claim 9, wherein:
  the estimating of the magnitude of the ripple current includes:
    detecting current flowing through the drive power supply line; and
    estimating the magnitude of the ripple current based on a detected current.

12. The motor control method according to claim 11, wherein:
  the current detected by the current detection device, is defined as I;
  a duty ratio in the PWM control manner is defined as Duty;
  the magnitude of the ripple current is defined as Jr; and
  the estimating of the magnitude of the ripple current further includes:
    estimating the magnitude of the ripple current according to an equation of:

$$Ir = I \times \{Duty \times (1 = Duty)\}^{1/2}.$$

13. The motor control method according to claim 11, wherein:
  the estimating of the magnitude of the ripple current further includes:
    estimating an internal temperature of a smoothing capacitor connected in the drive power supply line; and
    estimating the magnitude of the ripple current based on an estimated temperature and the detected current.

14. The motor control method according to claim 13, wherein:
  the estimating of the internal temperature of the smoothing capacitor includes:
    detecting a temperature of the smoothing capacitor using a diode; and
    estimating the internal temperature of the smoothing capacitor based on a detected temperature.

15. The motor control method according to claim 13, wherein:
  the estimating of the internal temperature of the smoothing capacitor includes:
    detecting a temperature of the smoothing capacitor using a thermistor; and
    estimating the internal temperature of the smoothing capacitor based on a detected temperature.

16. A motor control method for controlling a brushless DC motor by Pulse Width Modulation ("a PWM control manner") using an inverter circuit without a position sensor, the motor control method comprising:
  estimating a magnitude of a ripple current based on current flowing through a drive power supply line of the inverter circuit, wherein the inverter circuit includes a first output terminal and a second output terminal that are directly coupled to two energizing phases of the inverter circuit, respectively;
  when the magnitude of the ripple current is less than or equal to a threshold value, performing balanced-drive switching only during a predetermined time period that the first output terminal of the inverter circuit is repeatedly and alternately connected to a high voltage side and a low voltage side of a drive power supply, and the second output terminal of the inverter circuit, in an opposite way of the first output terminal, is repeatedly and alternately connected to the low voltage side and the high voltage side of the drive power supply, the predetermined time period being around a zero-cross point including a timing at which an induced voltage generated in a stator winding of the brushless DC motor is changed to pass through the zero-cross point;

when the magnitude of the ripple current is less than or equal to the threshold value, performing unbalanced-drive switching during a period other than the predetermined time period that the first output terminal of the inverter circuit is repeatedly and alternately connected to the high voltage side and the low voltage side, and the second output terminal of the inverter circuit is connected only to the low voltage side; and when the magnitude of the ripple current exceeds the threshold value, performing the unbalanced-drive switching during an entire time period.

* * * * *